(12) United States Patent
Ditlow et al.

(10) Patent No.: US 9,552,007 B2
(45) Date of Patent: Jan. 24, 2017

(54) PARALLEL TECHNIQUE FOR COMPUTING PROBLEM FUNCTIONS IN SOLVING OPTIMAL POWER FLOW

(71) Applicant: International Business Machines Corporation, Armonk, NY (US)

(72) Inventors: Gary Ditlow, Garrison, NY (US); Dung Phan, Ossining, NY (US); Jinjun Xiong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 14/134,351

(22) Filed: Dec. 19, 2013

(65) Prior Publication Data

US 2015/0177762 A1 Jun. 25, 2015

(51) Int. Cl.
| | | |
|---|---|---|
| *G05D 3/12* | (2006.01) | |
| *G05F 1/66* | (2006.01) | |
| *G06F 7/60* | (2006.01) | |
| *G06Q 50/06* | (2012.01) | |

(52) U.S. Cl.
CPC . *G05F 1/66* (2013.01); *G06F 7/60* (2013.01); *G06Q 50/06* (2013.01)

(58) Field of Classification Search
CPC .......................................................... G05F 1/66
USPC ................................................. 700/286–306
See application file for complete search history.

(56) References Cited

U.S. PATENT DOCUMENTS

| | | | |
|---|---|---|---|
| 6,492,801 B1 * | 12/2002 | Sims ...................... | H02J 3/1885 324/142 |
| 6,681,155 B1 * | 1/2004 | Fujita ................... | G05B 13/042 60/660 |
| 7,277,832 B2 | 10/2007 | Chiang | |
| 2005/0160128 A1 * | 7/2005 | Fardanesh ............. | G06F 17/504 708/446 |
| 2012/0150497 A1 * | 6/2012 | Sun ........................... | H02J 3/00 703/2 |

(Continued)

FOREIGN PATENT DOCUMENTS

| | | |
|---|---|---|
| CN | 101409447 A | 4/2009 |
| CN | 101409447 B | 9/2010 |

(Continued)

OTHER PUBLICATIONS

Nakashima, Tomoaki, and Tak Niimura. "Market plurality and manipulation: performance comparison of independent system operators." IEEE Transactions on Power Systems 17.3 (2002): pp. 762-767.*

(Continued)

*Primary Examiner* — Satish Rampuria
(74) *Attorney, Agent, or Firm* — Harrington & Smith

(57) ABSTRACT

An exemplary method includes solving on a computing system an optimal power flow formulation for a plurality of generators in a power system. The solving includes computing using multi-threaded parallelism a plurality of constraints for the formulation, computing using multi-threaded parallelism a plurality of Jacobian functions of the constraints, and computing using multi-threaded parallelism a Hessian of Lagrangian functions. The method further includes outputting results of the solving, wherein the results comprise values of generation levels for the plurality of generators. Apparatus and program products are also disclosed.

19 Claims, 6 Drawing Sheets

(56) References Cited

U.S. PATENT DOCUMENTS

2013/0238148 A1* 9/2013 Legbedji ............... G06Q 10/04
700/286

FOREIGN PATENT DOCUMENTS

| CN | 102545206 A | 7/2012 |
|---|---|---|
| JP | 2001016755 A | 1/2001 |

OTHER PUBLICATIONS

Cavin, R. K., M. C. Budge, and P. Rasmussen. "An optimal linear systems approach to load-frequency control." IEEE Transactions on Power Apparatus and Systems 6 (1971): pp. 2472-2482.*

Ghobeity, Amin, et al. "Optimal time-invariant operation of a power and water cogeneration solar-thermal plant." Solar Energy 85.9 (2011): pp. 2295-2320.*

Xia, Y. et al.; "Calculation of Available Transfer Capability with Transient Stability Constraints"; 2004 IEEE International Conference on Electric Utility Deregulation, Restructuring and Power Technologies; Apr. 2004; Hong Kong; pp. 128-132.

Tournier, JC. et al.; "Comparison of Direct and Iterative Sparse Linear Solvers for Power System Applications on Parallel Computing Platforms"; 17th Power Systems Computation Conference (PSCC); 2011; Stockholm, Sweden; whole document (7 pages).

Poore, A. et al.; "The Expanded Lagrangian System for Constrained Optimization Problems"; An IP.com Prior Art Database Technical Disclosure; http://ip.com/IPCOM/000149186; Apr. 13, 2007; whole document (33 pages).

Nocedal, J. et al.; "Projected Hessian Updating Algorithms for Nonlinearly Constrained Optimization"; An IP.com Prior Art Database Technical Disclosure; http://ip.com/IPCOM/000149449; Apr. 1, 2007; whole document (71 pages).

Phan, D.; "Lagrangian Duality and Branch-and-Bound Algorithms for Optimal Power Flow"; Operations Research, vol. 60, No. 2; Mar.-Apr. 2012; pp. 275-285.

Capitanescu, F. et al.; "Interior-point based algorithms for the solution of optimal power flow problems"; Electric Power Systems Research, vol. 77; 2007; pp. 508-517.

Wang, H. et al.; "On Computational Issues of Market-Based Optimal Power Flow"; IEE Transactions on Power Systems, vol. 22, No. 3; Aug. 2007; pp. 1185-1193.

Zavala, V.; Implementation and Solution of IPOPT Primal-Dual System; Downloaded from the Internet on Sep. 25, 2013; URL: http://www.mcs.anl.gov/~vzavala/ipopt_pd.pdf; whole document (3 pages).

Jiang, Q. et al.; "An Efficient Implementation of Automatic Differentiation in Interior Point Optimal Power Flow"; IEEE Transactions on Power Systems, vol. 25, No. 1; Feb. 2010; pp. 147-155.

Jiang, Q. et al.; "Power-current hybrid rectangular formulation for interior-point optimal power flow"; IET Generation, Transmission & Distribution, vol. 3, Iss. 8; 2009; pp. 748-756.

Zadeh, A. et al.; "Multi-Thread Security Constraint Economic Dispatch with Exact Loss Formulation"; IEEE International Conference on Power and Energy; Nov. 29-Dec. 1, 2010; Kuala Lumpur, Malaysia; pp. 864-869.

Zimmerman, R. et al.; "Matpower 4.1 User's Manual"; Dec. 14, 2011; whole document (116 pages); Power Systems Engineering Research Center.

Zimmerman, R.; "AC Power Flows, Generalized OPF Costs and their Derivatives using Complex Matrix Notation"; Feb. 24, 2010; whole document (25 pages); Power Systems Engineering Research Center.

Nocedal, J. et al.; "Projected Hessian Updating Algorithms for Nonlinearly Constrained Optimization"; Siam J. Numer. Anal, vol. 22, No. 5; Oct. 1985; pp. 821-850; Society for Industrial and Applied Mathematics.

Jiang, Q. et al.; "Power-current Hybrid Power Flow Model Based Optimal Power Flow by Interior Point Method"; Automation of Electric Power Systems, vol. 33, No. 12; 2009; pp. 32-37.

Raju, A.P. et al.; "An Efficient Technique of Calculating First and Second Order Derivatives in Newton based Optimal Power Flow Problem"; International Journal of Research and Reviews in Computer Science, vol. 3, No. 3; Jun. 2012; pp. 1645-1653.

Jabr, R.; "A Primal-Dual Interior-Point Method to Solve the Optimal Power Flow Dispatching Problem"; Optimization and Engineering, No. 4; 2003; pp. 309-336.

Torres, G. et al.; "An Interior-Point Method for Nonlinear Optimal Power Flow Using Voltage Rectangular Coordinates"; IEEE Transactions on Power Systems, vol. 13, No. 4; Nov. 1998; pp. 1211-1218.

* cited by examiner

PARALLEL TECHNIQUE FOR COMPUTING PROBLEM FUNCTIONS IN SOLVING OPTIMAL POWER FLOW

BACKGROUND

This invention relates generally to industry solutions for the Energy & Utility (E&U) industry and more particularly to E&U operation and planning studies involving optimal power flow.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Central to an E&U's daily operation and planning studies is to solve an optimal power flow (OPF) problem under various constraints (e.g., primary electrical power flow constraints). For instance, one question commonly posed is, what is the most economical generation dispatch schedule under those electrical power flow constraints?

Because of its complexity, OPF is typically solved approximately. As an example, alternating current (AC) power flow constraints are approximated by their direct current (DC) power flow constraints. Thus, the nonlinear optimization problem becomes a linear programming problem, which is relatively easy to solve.

Direct consideration of AC power flow constraints has high computation complexity. Particularly, constraints, Jacobian functions and Hessian functions need to be computed explicitly either through closed formulas (e.g., MatPower, which is a MATLAB power system simulation package) or automatic differentiation. The latter is described, e.g., by Jiang et al., "An Efficient implementation of Automatic Differentiation in Interior Point Optimal Power Flow", IEEE Transactions on Power Systems, Vol. 25, No. 1, February 2010, See also Prasad Raju, et al., "An efficient technique of calculating first and second order derivatives in newton based optimal power flow problem," International Journal of Research & Reviews in Computer Science, June 2012, Vol. 3 Issue 3, p 1645.

Problems with these approaches include that either the solution quality is low as an approach uses approximated electrical models, or the performance is low with high computation cost.

BRIEF SUMMARY

The following summary is merely intended to be exemplary. The summary is not intended to limit the scope of the claims.

An exemplary method includes solving on a computing system an optimal power flow formulation for a plurality of generators in a power system. The solving includes computing using multi-threaded parallelism a plurality of constraints for the formulation, computing using multi-threaded parallelism a plurality of Jacobian functions of the constraints, and computing using multi-threaded parallelism a Hessian of Lagrangian functions. The method further includes outputting results of the solving, wherein the results comprise values of generation levels for the plurality of generators. Apparatus and program products are also disclosed.

DETAILED DESCRIPTION

Figure 1:
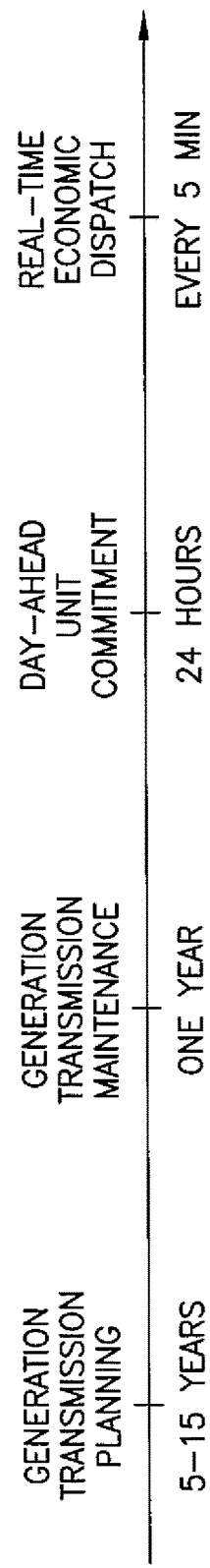
FIG. 1 is a block diagram that illustrates major problems in power systems operation.

It is not an exaggeration to say that modern electric power systems are built upon optimization models and solution techniques. FIG. 1 shows a diagram of the major optimization problems in power system operations with a time scale to indicate the horizon of the different types of decisions involved.

As a simple description, the long-term system planning studies the question of how much new generation and transmission capacity is needed and where in the power system they should be built in order to satisfy a projected future demand in a time horizon of 5 to 15 years or longer; the maintenance scheduling problem aims to optimally schedule the maintenance of generators, transformers, and other equipment so that the system operation will be disturbed as little as possible at a cost as low as possible, where the time horizon of decision is usually one year; the short-term operation problems determine daily or intraday generation schedules to match demand and satisfy various constraints.

All the major decision problems described above are built on two fundamental problems, the so-called unit commitment (UC) and economic dispatch based on optimal power flow (OPF). The instant disclosure concerns the optimal power flow.

Figure 2:
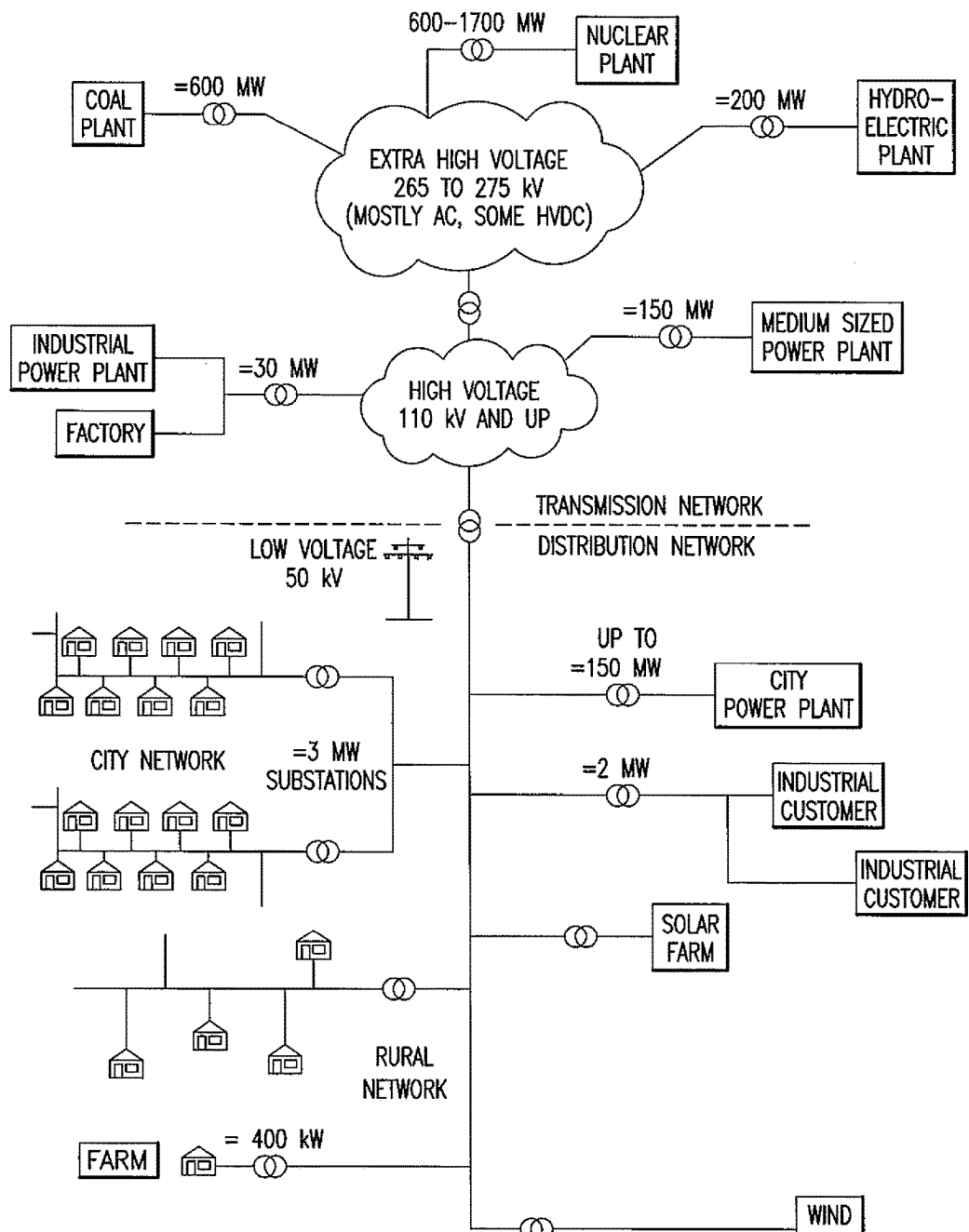
FIG. 2 illustrates an exemplary structure of an electric power system that consists of a generation system, a transmission network, and a distribution system.

A typical power system involves three major subsystems: a generation system, a transmission network, and the distribution system, FIG. 2 shows an illustration of such. The generation system usually consists of industrial scale power plants, each of which normally has several generators, also called generating units. In this case, there is a coal plant, a nuclear plant, a hydro-electric plant, an industrial power plane, and a medium sized power plant. The voltage of the power produced by the generating units is stepped up by transformers to voltage levels such as 265 to 275 kV (kilovolts) ("extra high voltage"), before connecting to the transmission network. In this example, the transmission network includes a 110 kV (and up) portion, which is considered to be high voltage. The high voltage levels help to reduce the thermal loss incurred during long distance transfer of power along transmission lines. The nodes of the transmission network, also called buses in the power system literature, represent physical points where the transmission lines connect to each other, and generators and/or loads are linked to the network. The transmission network is usually sparse and meshed. Before the power is served to the load, voltage is again stepped down to low levels of a few kilo volts (as illustrated by the 50 kV "low voltage"), and ultimately to 120V or 240V in North America. This low voltage network is called the distribution system, which directly connects to the end users of electricity. In this example, the distribution system also includes power generation capability, from the city power plant, a solar farm, a wind farm, and some 3 MW (megawatt) substations. These rings in the figure are used to highlight a group of customers or generators. The associated MW is a typical capacity for the group of customers or generators.

In an example, the utilities may want to know how much power output their generators should be producing at some time. For instance, how much power should the coal plant, the nuclear plant, or any of the other power producers produce based on loads being used by customers and power produced by other generators? Utilities are trying to minimize the total cost of generation while satisfying the demand and electrical constraints. This is especially true since fuel prices, operating costs, power losses, and the like are different for each of the various utilities. This type of problem may be solved via an optimal flow problem.

The optimum flow problem considered herein mainly concerns the high voltage transmission network, although with the increase of distributed generators, the distribution system is changing from a largely consumer network to a hybrid of power consumers and suppliers. The exemplary embodiments presented herein can be extended to the distribution system as well.

Figure 3A:
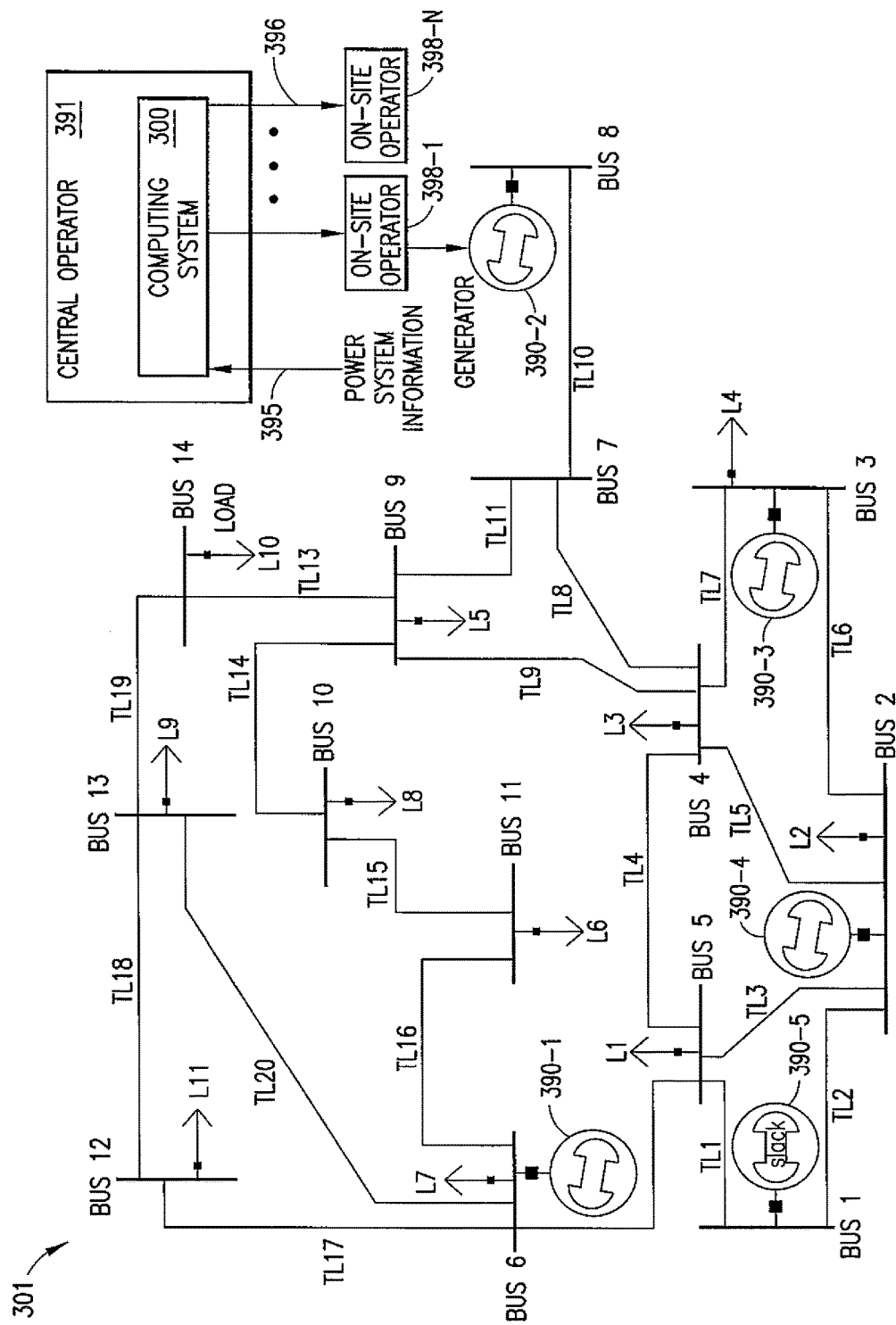
FIG. 3A shows an example diagram of a power system with 14 buses, 20 transmission lines, 5 generators (the circle symbols) at buses 1, 3, 6, and 8, and 11 loads (the arrows pointing out from buses)
Figure 3B:
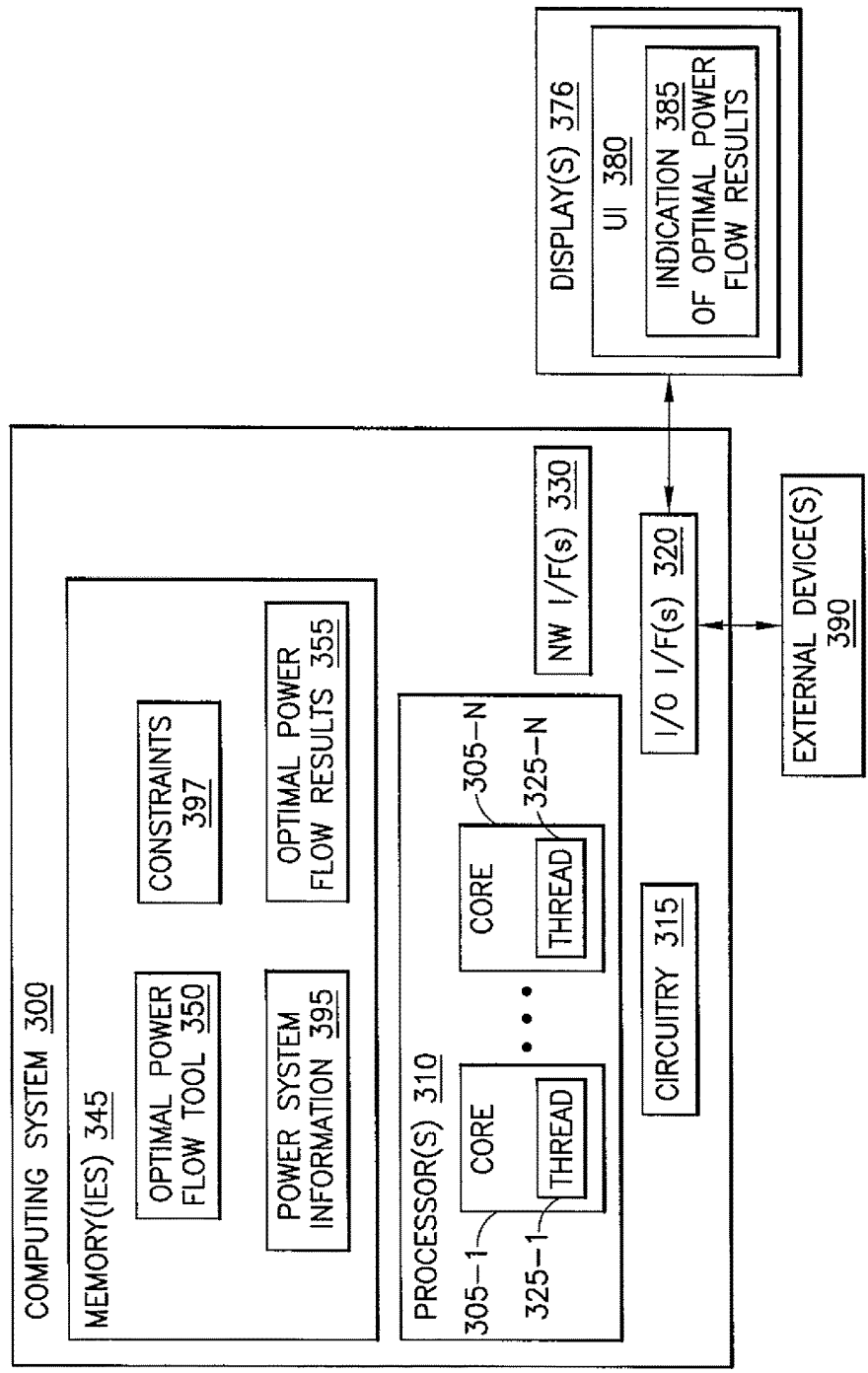
FIG. 3B shows a block diagram of a computing system shown in FIG. 3A.

FIG. 3A shows a simple example of a power system 301, which has 14 buses, 20 transmission lines T11-TL20, 5 generators 390-1 to 390-5, and 11 loads L1-L11. Transformers, breakers, and other equipment are ignored. FIG. 3B shows a block diagram of a computing system 300 shown in FIG. 3A. The power system 301 has a central operation that includes a computing system 300, and the computing system 300 uses, e.g., power system information 395 (e.g., demands and other information) to solve the optimal power flow to determine a generation level for each generator. The information about the value(s) of the generation levels is output, e.g., as one or more output signals 396 and sent to on-site operators 398-1 to 398-N (in this example). In the example of FIG. 3A, the on-site operator is coupled to and is able to adjust a generation level of at least the generator 390-2. Other on-site operators 398 may be coupled to and able to adjust generation levels of other generators 390.

When real-time operation starts, the utility operator dispatches committed generators 390 to meet realized demand at a minimum total generation cost. This procedure is called economic dispatch. The underlying optimization problem is called optimal power flow, which involves continuous decision variables, i.e., generation output and voltages, and very often only has one decision period. In typical usage, the optimal power flow problem is solved every 5 to 15 minutes.

Due to the nonlinear and nonconvex nature of the optimal power flow, it is still a challenge to obtain fast, robust solutions to this problem in large-scale power systems. New challenges are emerging too. For example, unconventional generators such as wind and solar power are intrinsically stochastic; how to deal with such uncertainties poses challenges for large-scale integration of variable generation resources into the power grid.

Thus, solving the optimum power flow is important currently and will remain important as these unconventional generators become more prevalent. As described in more detail below, the instant exemplary embodiments provide improved techniques for solving the optimum power flow.

Turning to FIG. 3B, this figure provides an overview of a computing system 300 suitable for use with exemplary embodiments herein. The computing system 300 comprises one or more memories 345, one or more processors 310, one or more I/O interfaces 320, and one or more wired or wireless network interfaces 330. Alternatively or in addition to the one or more processors 310, the computing system 300 may comprise circuitry 315. The computing system 300 is coupled to or includes one or more displays 376 and one or more external device(s) 390. In one example, the one or more memories 145 include an optimal power flow tool 350, power system information 395, constraints 397, and optimal power flow results 155. The optimal power flow tool 350 is implemented in an exemplary embodiment as computer-readable program code that is executable by the one or more processors 310 to cause the computing system 300 to perform one or more of the operations described herein. In another example, the operations may also be performed, in part or completely, by circuitry 315 that implements logic to carry out the operations. The circuitry 315 may be implemented as part of the one or more processors 310 or may be separate from the one or more processors 310.

The processor(s) 310 may be any processing units, such as digital signal processors, graphics processing units, and/or single-core or multi-core general purpose processors. Because of the complexity of the processing performed herein, typically, the processor(s) 310 would be multi-threaded, generally with a thread per core, although some processors allow fewer cores than threads. Also, graphics processing units (GPUs) are increasingly being used for mathematical operations, such as matrix manipulation or multiplication, e.g., since the graphics processing units provide a high degree of parallelism. A high-end, expensive general purpose processor may have several or tens of cores, each capable of running one or more threads. By contrast, a GPU may be able to perform calculations in parallel with thousands of cores and therefor thousands of threads. There are special frameworks that allow science applications to run on GPUs. One such framework is NVIDIA's Compute Unified Device Architecture (CUDA) framework. While algorithms must be rewritten to make them data parallel (that is, data are distributed across different threads), such parallel threads may use floating point units, and therefore the speed of these parallel operations can approach or exceed multiple teraflops (where one teraflop is one trillion floating point operations per second).

Thus, in the example of FIG. 3B, there are N cores 305-1 to 305-N, each of which performs calculations using a corresponding thread 325. Although a single thread 325 is shown per core 305, a single core 305 may perform calculations using multiple threads 325.

The circuitry 315 may be any electronic circuit such as an application specific integrated circuit or programmable logic. The memories 345 may comprise non-volatile and/or volatile RAM (random access memory), cache memory, NAND-based flash memory, long term storage (e.g., hard drive), and/or read only memory. The one or more I/O interfaces 320 may include interfaces through which a user may interact with the computing system 300. The display(s) 376 may be a touchscreen, flatscreen, monitor, television, projector, as examples.

In one embodiment, users interact with the optimal power flow tool 350 through the UI 180 on the display 376 in an exemplary embodiment or through the network interface(s) 330 in another non-limiting embodiment. The external device(s) 390 enable a user to interact in one exemplary embodiment with the computing system 300 and may include a mouse, trackball, keyboard, and the like. The network interfaces 330 may be wired and/or wireless and may implement a number of protocols, such as cellular or local area network protocols. The elements in computing system 300 may be interconnected through any technology, such as buses, traces on a board, interconnects on semiconductors, and the like.

The optimal power flow tool 350 generates, using at least the power system information 395 and constraints 397, optimal power flow results 355. The power system information 395 includes such items as voltage, current, and power at certain locations (e.g., at the outputs of the generators 390). There are a number of constraints 397 that have to be considered. There are constraints on the maximum and minimum generation output levels that each generator can achieve, and transmission network constraints that involve power flow equations and power flow limits on transmission lines. There are also constraints on the voltage limits on buses. The generation output levels and voltage levels are modeled as continuous variables. The power flow equations and network constraints involve nonlinear nonconvex functions of the continuous variables. Indications 385 of the optimal power flow results 355 could be shown on UI 380 and displayed to a user or sent via the network interface(s) 330 to a user.

The exemplary embodiments herein provide methods and systems for computing function constraints, Jacobians, and Hessians for solving optimal power flow with AC power flow constraints. The exemplary embodiments provide computational speed up using multi-threading parallelism. For instance, embodiments may use complex numbers everywhere instead of computationally expensive-cost functions sin(x) (sine) and cos(x) (cosine). Exemplary embodiments propose as scheme to compute function constraints such that the main computation burden for a Jacobian evaluation is reused from the function constraints evaluation. As a further example, all Jacobian entries are used by the Hessian evaluation, and these are all performed using multi-threaded parallelism to efficiently compute sub-matrices.

The exemplary embodiments support real-time operation with AC OPF and provide a large cost savings. Most of the conventional AC OPF solvers required to efficiently evaluate these functions, such as gradient-type algorithms, use function constraints and Jacobian evaluation, while interior-point algorithms need to use function constraints, Jacobian evaluation, and Hessian evaluation. The examples herein use inter-point algorithms, and use function constraints, Jacobian evaluation, and Hessian evaluation, but the exemplary embodiments are not constrained to the use of these algorithms.

Many existing power grid related planning and operation studies can benefit from the instant techniques. For instance, economic dispatch, wind integration or photovoltaic installation studies, security analysis, and the like may benefit.

An optimal power flow formulation is as follows:

$$\min F(P_i^g) = \sum_{i=1}^{n_g} [a_i(P_i^g)^2 + b_i P_i^g + c_i]$$

$$\text{s.t.} \quad P_i(\delta, v) - P_i^g + P_i^d = 0$$

$$Q_i(\delta, v) - Q_i^g + Q_i^d = 0$$

$$|S_{ij}(\delta, v)| \le S_{ij}^{max}$$

$$v_i^{min} \le |v_i| \le v_i^{max}$$

$$P_i^{min} \le P_i^g \le P_i^{max}$$

$$Q_i^{min} \le Q_i^g \le Q_i^{max}$$

The function $F(P_i^g)$ is a function to be minimized such that ("s.t.") the constraints shown above are met. The following are definitions of the terms m the formulation above: $n_g$ is the number of generators committed in the power system (e.g., power system 301 of FIG. 3A), $P_i^g$ is the real power output of the i-th generator, $a_i$, $b_i$, $c_i$ are cost coefficients of the i-th generator, $P_i(\delta,v)$ is this the instantaneous power of the i-th generator relative to the phase and voltage, $P_i^d$ is the power &m and at the i-th generator, $Q_i(\delta,v)$ is this the instantaneous reactive power of the i-th generator relative to the phase and voltage, $Q_i^g$ is the reactive power at the i-th generator, $Q_i^d$ is the reactive power demand at the i-th generator, $S_{ij}(\delta,v)$ is the power on a transmission line from node i to node j, $S_{ij}^{max}$ is the maximum possible power on the transmission line from i to j, $v_i^{min}$ is the minimum voltage able to be produced by the i-th generator, $|v_i|$ is the magnitude of the voltage (e.g., to be) produced by the i-th generator, $v_i^{max}$ the maximum voltage able to be produced by the i-th generator, $P_i^{min}$ is the minimum real power able to be produced by the i-th generator. $P_i^g$ is the real newer (e.g., to be) produced by the i-th generator, $P_i^{max}$ is the maximum real power able to be produced by the i-th generator, $Q_i^{min}$ is the minimum reactive power able to be produced by the i-th generator, $Q_i^g$ is the reactive power (e.g., to be) produced by the i-th generator, and $Q_i^{max}$ is the maximum reactive power able to be produced by the i-th generator.

Figure 4:
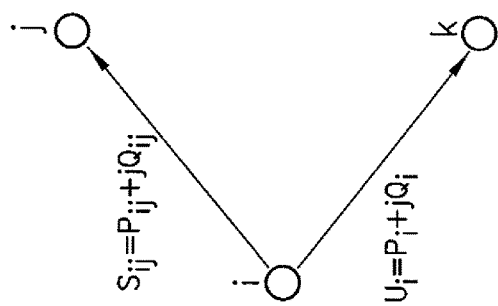
FIG. 4 is an illustration of power injection $U_i$ on node and power flow $S_{ij}$ from node i to node j.
Figure 5:
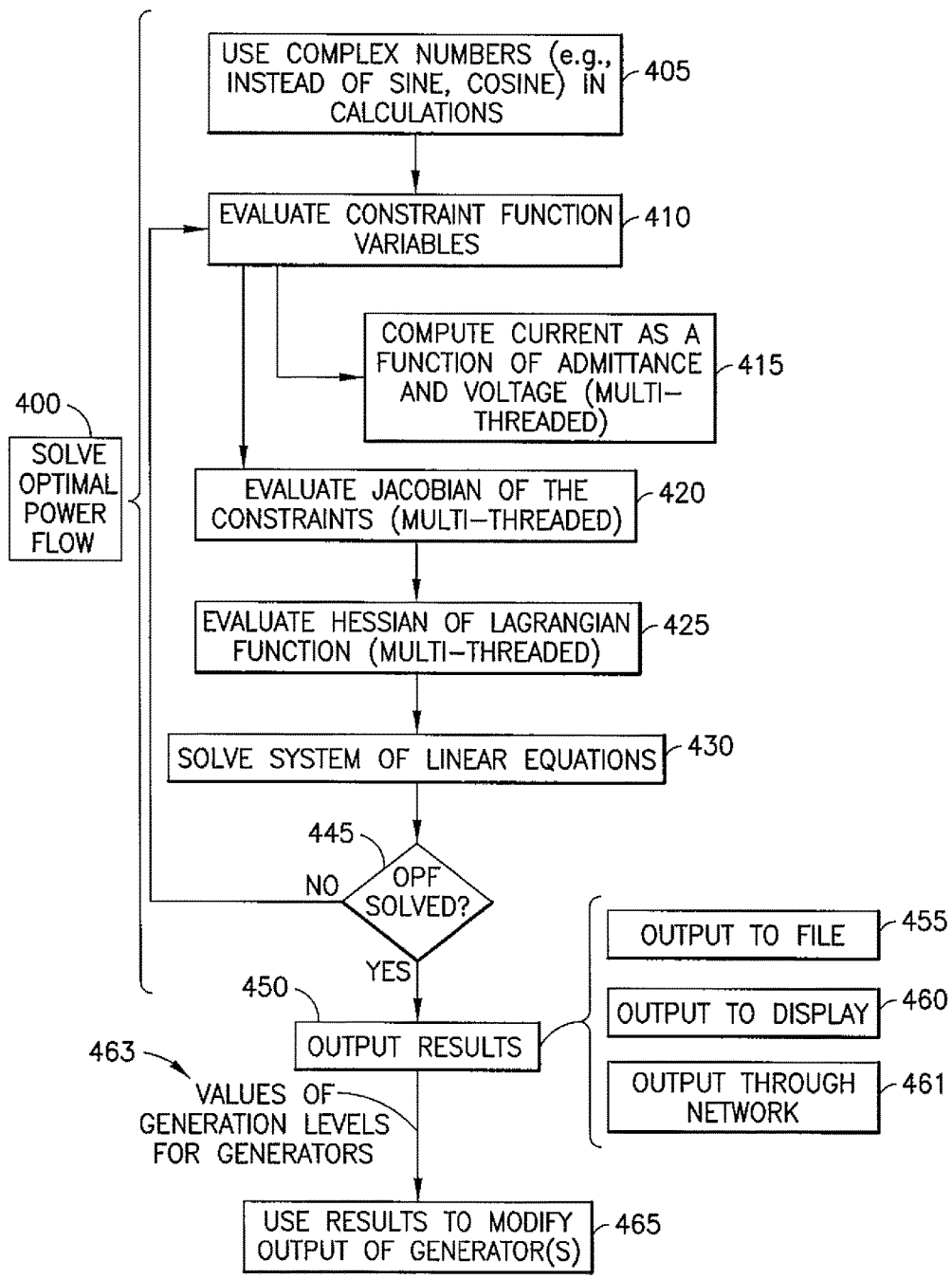
FIG. 5 is a logic flow diagram for performing a parallel method for computing problem functions in solving optimal power flow, and illustrates the operation of an exemplary method, a result of execution of computer program instructions embodied on a computer readable memory, and/or functions performed by logic implemented in hardware, in accordance with an exemplary embodiment.

The OFF formulation can be rewritten in a compact form as follows:

$$\min f(x)$$

$$\text{s.t.} \quad \underline{g} \le g(x) \le \overline{g}$$

$$x^L \le x \le x^U$$

where f(x) corresponds to $F(P_i^g)$, the function g(x) combines the upper three constraints from above (that is, $P_i(\delta,v)-P_i^g+P_i^d=0$, $Q_i(\delta,v)-Q_i^g+Q_i^d=0$, and $|S_{ij}(\delta,v)|\le S_{ij}^{max}$), $\underline{g}$ and $\overline{g}$ are lower and upper limits, respectively, of the function g(x), and the variable x represents $(P_i^g,Q_i^g,v,\delta)$, and $x^L$ and $x^U$ are lower and upper limits, respectively, of the lower three constraints from above (that is, $v_i^{min}\le|v_i|\le v_i^{max}$, $P_i^{min}\le P_i^g\le P_i^{max}$, and $Q_i^{min}\le Q_i^g\le Q_i^{max}$). See FIG. 4, which is an illustration of complex power injection $U_i$ on node i and power flow $S_{ij}$ from node i to node j;

Now that the optimum power flow formulation has been presented, an exemplary algorithm for solving the formulation is presented. Turning to FIG. 5, this figure is a logic flow diagram for performing a parallel method for computing problem functions in solving optimal power flow. This figure illustrates the operation of an exemplary method, a result of execution of computer program instructions embodied on a computer readable memory, and/or functions performed by logic implemented in hardware, in accordance with an exemplary embodiment. The blocks in FIG. 5 are assumed to be performed by the computing system 300, e.g., under control of the optimal power flow tool 350. In an exemplary embodiment and in accordance with FIG. 3A, blocks 400-460 are assumed to be performed by a central operator 391, while block 465 is assumed to be performed by an on-site operator 398. However, this is merely one example, and other examples are possible. For instance, a single utility may be able to perform all the blocks in FIG. 5.

In particular, the computing system 300 is to solve the optimal power flow, e.g., as formulated above, in block 400. Block 400 includes blocks 405-445 in this example. In block 405, the computing system 300 use complex numbers (e.g., instead of trigonometric functions such as sine, cosine) in calculations. That is, the computing system 300 uses and $e^{-jx}$ in appropriate equations instead of sin(x) and cos(x). Block 405 is applied to the other blocks in the flow of FIG. 5 that perform calculations.

The interior-point method is a powerful tool, used to solve the nonlinear problem presented by the optimal power flow formulation. While other methods may be used to solve the OPF problem, the interior-point method is typically the most efficient method. Some references describing the interior-point method include the following: 1) Capitanescu, F., et al.: Interior-point based algorithms for the solution of optimal power flow problems, Electric Power Systems Research 77(5-6), 508-517 (2007); 2) Jahr, R. A.: A primal-dual interior-point method to solve the optimal power flow dispatching problem. Optimization and Engineering 4(4), 309-336 (2003); 3) Torres, G., Quintana, V.: An interior-point method for nonlinear optimal power flow using voltage rectangular coordinates, IEEE Transactions on Power Systems 13(4), 1211-1218 (1998); and 4) Wane, H., et al.: On computational issues of market-based optimal power flow IEEE Transactions on Power Systems 22(3), 1185-1193 (2007). There are four main computational efforts in each iteration of the interior-point method. These efforts are represented as blocks 410, 420, 425, and 430 in FIG. 5.

In block 410, the constraint function variables, $g_i(x)$, are evaluated. As described below in more detail, one portion of block 410 is to compute current as a function of admittance and voltage (block 415). As described below, the computation of current may be performed in a multi-threaded manner (that is, using multiple threads 325), which speeds up the process dramatically relative to conventional techniques.

In block 420, the Jacobian of the constraints, $\nabla g_i(x)$, is evaluated. As described below, this evaluation may be multi-threaded using multiple threads 325. Again, use of multi-threading allows a tremendous increase in speed over conventional techniques. In block 425 the Hessian of the Lagrangian function, $\nabla^2 f(x) + \Sigma_{i=1}^{m} \lambda_i \nabla^2 g_i(x)$, is evaluated. As described below, this evaluation may be multi-threaded using multiple threads 325. Use of multi-threading allows a tremendous increase in speed over conventional techniques. In block 430, a system of linear equations, Ax=b, is solved. There are several ways to write down a system of linear equations. It depends on what interior-point method is used (as there are several interior-point methods), but these methods have a common fact that constraint functions $g_i(x)$, the Jacobian of the constraints, $\nabla g_i(x)$, and the Hessian of the Lagrangian function, $\nabla^2 f(x) + \Sigma_{i=1}^{m} \lambda_i \nabla^2 g_i(x)$, are entries of a matrix A and a vector b. For example, see Victor M. Zavala, "Implementation and Solution, of IPOPT Primal-Dual System" for a form Ax=b, the linear equation is described in Equation (10) of Zavala, shown below:

$$\begin{bmatrix} W - D_x & 0 & J_c^T & J_d^T \\ 0 & D_s & 0 & -I \\ J_c & 0 & 0 & 0 \\ J_d & I & 0 & 0 \end{bmatrix} \begin{pmatrix} \Delta x \\ \Delta s \\ \Delta y_c \\ \Delta y_d \end{pmatrix} = - \begin{pmatrix} \nabla_x \mathcal{L} \\ \nabla_s \mathcal{L} \\ c(x) \\ d(x) \quad s \end{pmatrix},$$

where $W+D_s$ is a Hessian function, at least $J_c^T$ and $J_d^T$ are Jacobian functions of the matrix A, $\Delta x$ is an entry in the vector x, and c(x) is an entry in the vector b.

In block 445, it is determined if the OPF (optimum power flow) is solved. If the OPF is not (block 455=No), the flow proceeds to block 410. If the OPF is solved (block 445—Yes), in block 450 the optimum power flow results 355 are output, such as to a file (block 455, e.g., in memory(ies) 345) or to a display (block 460) or through a network interface 330 (block 461, e.g., to one or more operators). It is noted that there may be multiple on-site operators 398 and some portion (that is, less than all) of the results 355 may be output to each on-site operator 398. In an example, the optimum power flow results 355 are the values 463 of generation levels for generators. In block 465, one or more on-site operators 398 use the results 355 to modify the output of one or more generators 390. The one or more on-site operators 398 modify the active and reactive power at corresponding ones of the generators 390.

Figure 6:
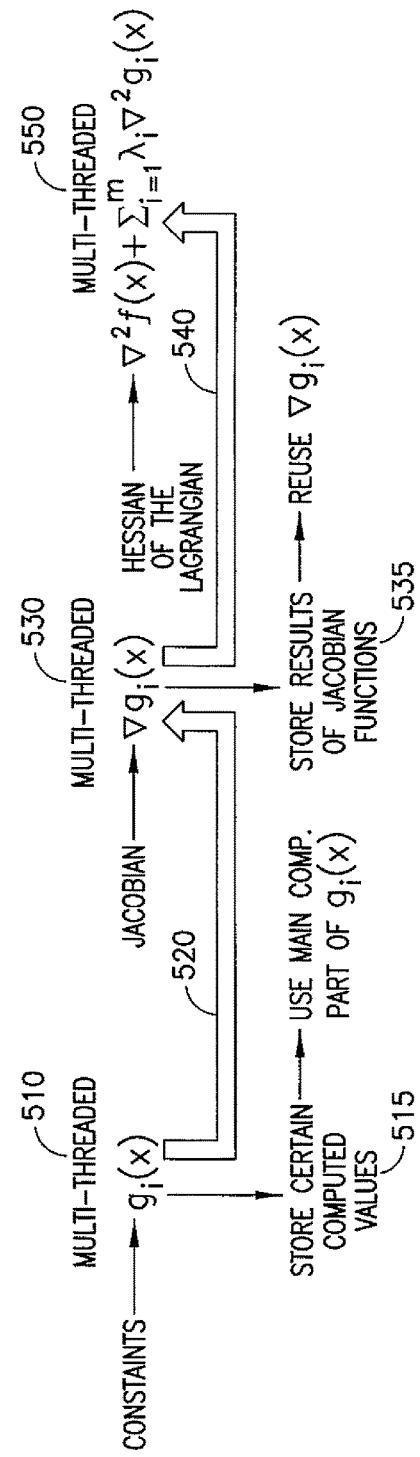
FIG. 6 is a diagram visually illustrating, multi-threading as applied to some of the blocks of FIG. 5 and illustrating results of operations of the blocks that are being used in subsequent multi-threaded operations.

Turning to FIG. 6, this figure is a diagram visually illustrating multi-threading as applied to sonic of the blocks of FIG. 5 and illustrating results of operations of the blocks that are being used in subsequent multi-threaded operations. The multi-threaded operations 510 correspond to blocks 410 and 415, where the constraint function variables, $g_i(x)$, are evaluated. We will compute these problem functions in polar coordinates using complex number representation.

Computing the constraint function values $g(x)=(U_i, S_{ij})$ (see blocks 410 and 415 of FIG. 5), for $U_i$ (where $U_i$ is power injection on node i, $U_i=P_i+jQ_i$), we have $$U(v(t),i^*(t))=vi^*-(p_g-p_d) \qquad (1)$$

where $t=(|v|,\delta)$ is a state variable and $\delta$ is an instantaneous phase, and $$i^* = Y^* v^* = \begin{bmatrix} Y_1^* v^* \\ Y_2^* v^* \\ \vdots \\ Y_k^* v^* \end{bmatrix}. \qquad (2)$$

i is the current injection for every node, Y is an admittance matrix, v is the voltage vector, and "*" denotes the conjugate of a complex number. It is noted that each of the Y*v* may be computed in parallel is multi-threaded parallelism (as indicated by reference 510 in FIG. 6).

For $S_{ij}$, we have $$S_{ij}=v_i i_{ij}^*=|v_i|^2 y_{ij}^*-v_i v_j^* y_{ij}^*, \qquad (3)$$

where $v_i$ is a voltage at node i, $v_j^*$ is a conjugate of a voltage at node j, and $y_{ij}^*$ is a conjugate of an admittance from node i to a node j. Thus (where "diag" means the matrix is diagonalized):

$$S = [S_{ij}]_{n \times n} = \text{diag}(|v|^2)Y - \text{diag}(v)Y^*\text{diag}(v^*) \quad (4)$$

$$= \begin{bmatrix} \left[\text{diag}(|v_{1:n_1}|^2) \begin{bmatrix} Y_{1,:} \\ \vdots \\ Y_{n_1,:} \end{bmatrix} - \text{diag}(|v_{1:n_1}|) \begin{bmatrix} Y_{1,:} \\ \vdots \\ Y_{n_1,:} \end{bmatrix} \text{diag}(v^*)\right] \\ \left[\text{diag}(|v_{n_1+1:n_2}|^2) \begin{bmatrix} Y_{n_1+1,:} \\ \vdots \\ Y_{n_2,:} \end{bmatrix} - \text{diag}(|v_{n_1+1:n_2}|) \begin{bmatrix} Y_{n_1+1,:} \\ \vdots \\ Y_{n_2,:} \end{bmatrix} \text{diag}(v^*)\right] \\ \vdots \\ \left[\text{diag}(|v_{n_{k-1}+1:n}|^2) \begin{bmatrix} Y_{n_{k-1}+1,:} \\ \vdots \\ Y_{n_k,:} \end{bmatrix} - \right. \\ \left.\text{diag}(|v_{n_{k-1}+1:n}|) \begin{bmatrix} Y_{n_{k-1}+1,:} \\ \vdots \\ Y_{n_k,:} \end{bmatrix} \text{diag}(v^*)\right] \end{bmatrix}$$

Hence, both the current vector i (from (3)) and the complex power flow S (from (4)) can be computed in parallel, e.g., in k processors. This corresponds to block 410 and 415 of FIG. 5 is indicated by reference 510 of FIG. 6.

It should be noted that the values for the conjugate current vector i* (computed from (2)), $S_{ij}$ and $v_i v_j^* y_{ij}^*$ (computed from (3)) are stored (block 515), since these values will be reused in computing the Jacobian $\nabla g(x)$.

Concerning computing the Jacobian $\nabla g(x) = (\nabla U_i, \nabla S_{ij})$ (see block 420 of FIG. 5), we will show that it is possible to reuse (reference 520 in FIG. 6 the quantities computed from the function values g(x) in order to compute $\nabla g(x)$, and ho this can be manipulated in parallel (reference 530 in FIG. 6). This means that the results of the Jacobian functions are stored (reference 535) and are reused (reference 540) in computation 550 of the Hessians of the Lagrangian functions.

For $\nabla U = (\partial U/\partial|v|, \partial U/\partial\delta)$, we have:

$$\frac{\partial U}{\partial t} = \frac{\partial g}{\partial v}\frac{\partial v}{\partial t} + \frac{\partial g}{\partial i^*}\frac{\partial i^*}{\partial v^*}\frac{\partial v^*}{\partial t},$$

where $$\frac{\partial U}{\partial v} = i^*, \quad \frac{\partial U}{\partial i^*} = v, \quad \frac{\partial i^*}{\partial v^*} = Y^*, \quad \frac{\partial v}{\partial |v|} = e^{j\delta} = \frac{|v|e^{j\delta}}{|v|} = \frac{v}{|v|},$$

$$\frac{\partial v}{\partial \delta} = j|v|e^{j\delta} = jv,$$

and j is the imaginary unit.

Thus, $$\frac{\partial U}{\partial |v|} = \text{diag}(i^*)\text{diag}\left(\frac{v}{|v|}\right) + \text{diag}(v)Y^*\text{diag}\left(\frac{v^*}{|v|}\right) \quad (5)$$

$$= \begin{bmatrix} \frac{|v_1|^2 y_{11}^*}{|v_1|} + i_1^* \frac{v_1}{|v_1|}, & \frac{v_1 v_2^* y_{12}^*}{|v_2|}, & \cdots, & \frac{v_1 v_n^* y_{1n}^*}{|v_n|} \\ \frac{v_2 v_1^* y_{21}^*}{|v_1|}, & \frac{|v_2|^2 y_{22}^*}{|v_2|} + i_2^* \frac{v_2}{|v_2|}, & \cdots, & \frac{v_2 v_n^* y_{2n}^*}{|v_n|} \\ \vdots & & & \\ \frac{v_n v_1^* y_{n1}^*}{|v_1|}, & \frac{v_n v_2^* y_{n2}^*}{|v_2|}, & \cdots, & \frac{|v_n|^2 y_{nn}^*}{|v_n|} + i_n^* \frac{v_n}{|v_n|} \end{bmatrix}.$$

We note that entries $v_i v_j^* y_{ij}^*$ and $i_k^*$ for the Jacobian matrix $\partial U/\partial|v|$ have been computed when computing the function values g(x). This is indicated by reference 520 of FIG. 6.

The parallelism (see reference 530 of FIG. 5) for $\partial U/\partial|v|$ will be handled by grouping columns a follows (where each column may be computed in parallel).

$$\frac{\partial U}{\partial |v|} = \left[\left[\frac{1}{|v_1|}\begin{bmatrix} |v_1|^2 y_{11}^* + i_1^* v_1 \\ v_2 v_1^* y_{21}^* \\ \vdots \\ v_n v_1^* y_{n1}^* \end{bmatrix}, \cdots, \frac{1}{|v_{n_1}|}\begin{bmatrix} v_1 v_{n_1}^* y_{1n_1}^* \\ v_2 v_{n_1}^* y_{2n_1}^* \\ \vdots \\ v_n v_{n_1}^* y_{nn_1}^* \end{bmatrix}\right], \cdots,\right.$$

$$\left.\frac{1}{|v_{n_{k-1}+1}|}\begin{bmatrix} v_1 v_{n_{k-1}+1}^* y_{1n_{k-1}+1}^* \\ v_2 v_{n_{k-1}+1}^* y_{2n_{k-1}+1}^* \\ \vdots \\ v_n v_{n_{k-1}+1}^* y_{nn_{k-1}+1}^* \end{bmatrix}, \cdots, \frac{1}{|v_n|}\begin{bmatrix} v_1 v_n^* y_{1n}^* \\ v_2 v_n^* y_{2n}^* \\ \vdots \\ |v_n|^2 y_{nn}^* + i_n^* v_n \end{bmatrix}\right]$$

Similarly, we have $$\frac{\partial U}{\partial \delta} = \text{diag}(i^*)\text{diag}(jv) + \text{diag}(v)Y^*\text{diag}((jv)^*) \quad (6)$$

$$= -j\begin{bmatrix} |v_1|^2 y_{11}^* - i_1^* v_1, & v_1 v_2^* y_{12}^*, & \cdots, & v_1 v_n^* y_{1n}^* \\ v_2 v_1^* y_{21}^*, & |v_2|^2 y_{22}^* - i_2^* v_2, & \cdots, & v_2 v_n^* y_{2n}^* \\ \vdots & & & \\ v_n v_1^* y_{n1}^*, & v_n v_2^* y_{n2}^*, & \cdots, & |v_n|^2 y_{nn}^* - i_n^* v_n \end{bmatrix}.$$

The parallelism (see reference 530 of FIG. 5) for $\partial U/\partial\delta$ will be handle by grouping columns as follows (where each column may be computed in parallel).

$$\frac{\partial U}{\partial \delta} = \left[\left[\begin{bmatrix} |v_1|^2 y_{11}^* - i_1^* v_1 \\ v_2 v_1^* y_{21}^* \\ \vdots \\ v_n v_1^* y_{n1}^* \end{bmatrix}, \cdots, \begin{bmatrix} v_1 v_{n_1}^* y_{1n_1}^* \\ v_2 v_{n_1}^* y_{2n_1}^* \\ \vdots \\ v_n v_{n_1}^* y_{nn_1}^* \end{bmatrix}\right],\right.$$

$$\left.\cdots, \left[\begin{bmatrix} v_1 v_{n_{k-1}}^* y_{1n_{k-1}}^* \\ v_2 v_{n_{k-1}}^* y_{2n_{k-1}}^* \\ \vdots \\ v_n v_{n_{k-1}}^* y_{nn_{k-1}}^* \end{bmatrix}, \cdots, \begin{bmatrix} v_1 v_n^* y_{1n}^* \\ v_2 v_n^* y_{2n}^* \\ \vdots \\ |v_n|^2 y_{nn}^* - i_n^* v_n \end{bmatrix}\right]\right]$$

For $\nabla S$, we have:

$$\frac{\partial S_{ij}}{\partial t_i} = \frac{\partial S_{ij}}{\partial v_i}\frac{\partial v_i}{\partial t_i} + \frac{\partial S_{ij}}{\partial i_{ij}^*}\frac{\partial i_{ij}^*}{\partial v_i^*}\frac{\partial v_i^*}{\partial t_i},$$

where $$\frac{\partial S_{ij}}{\partial v_i} = i_{ij}^*, \quad \frac{\partial S_{ij}}{\partial i_{ij}^*} = v_i, \quad \frac{\partial i_{ij}^*}{\partial v_i^*} = y_{ij}^*.$$

Thus $$\frac{\partial S_{ij}}{\partial |v_i|} = i_{ij}^* \frac{v_i}{|v_i|} + v_i y_{ij}^* \frac{v_i^*}{|v_i|} = \frac{S_{ij}}{|v_i|} + |v_i|y_{ij}^* \quad (7)$$

-continued $$\frac{\partial S_{ij}}{\partial \delta_i} = \bar{t}_{ij}^*(jv_i) + v_i y_{ij}^*(jv_i)^* = jS_{ij} - j|v_i|^2 y_{ij}^* = -jv_i v_j^* y_{ij}^*. \quad (8)$$

Similarly, we have $$\frac{\partial S_{ij}}{\partial t_j} = -v_i y_{ij}^* = -\frac{v_i v_j^* y_{ij}^*}{|v_j|}.$$

Thus, $$\frac{\partial S_{ij}}{\partial |v_j|} = -v_i y_{ij}^* e^{-j\delta_j} = -\frac{v_i v_j^* y_{ij}^*}{|v_j|}. \quad (9)$$

$$\frac{\partial S_{ij}}{\partial \delta_j} = jv_i v_j^* y_{ij}^* = -\frac{\partial S_{ij}}{\partial \delta_i}. \quad (10)$$

Again, entries $S_{ij}$ and $v_i v_j^* y_{ij}^*$ for computing $$\frac{\partial S_{ij}}{\partial |v_i|}, \frac{\partial S_{ij}}{\partial \delta_i}, \frac{\partial S_{ij}}{\partial |v_j|} \text{ and } \frac{\partial S_{ij}}{\partial \delta_j}$$

were computed when computing g(x), e.g., see Equation (3) and reference 520 of FIG. 6.

Furthermore, we can compute $$\frac{\partial S_{ij}}{\partial |v_i|}, \frac{\partial S_{ij}}{\partial \delta_i}, \frac{\partial S_{ij}}{\partial |v_j|} \text{ and } \frac{\partial S_{ij}}{\partial \delta_j}$$

in parallel (as illustrated by reference 530 of FIG. 6).

Regarding computing the Hessian $\nabla^2 g(x) = (\nabla^2 P_i, \nabla^2 Q_i, \nabla^2 P_{ij}, \nabla^2 Q_{ij})$ (see block 425 of FIG. 5), we will show that all entries for Hessian $\nabla^2 g(x)$ can be computed (see block 550 of FIG. 6) from the Jacobian $\Delta g(x)$ and therefore the results of the Jacobian functions may be stored (reference 535) and reused (reference 540) in order to compute (reference 550) the Hessians of the Lagrangian functions.

A Hessian matrix is a square matrix of second order partial derivatives of a function (in this case, a Lagrangian Function). The Hessian matrix describes the local curvature of a function of many variables. An exemplary Hessian matrix is the following:

$$\nabla_{xx}^2 F + \sum_i \lambda_i \nabla_{xx}^2 g_i =$$

$$\begin{bmatrix} \delta & v & P^g & Q^g \\ \sum_i \lambda_i \nabla_{\delta\delta}^2 g_i(x) & \sum_i \lambda_i \nabla_{\delta v}^2 g_i(x) & 0 & 0 \\ \sum_i \lambda_i \nabla_{v\delta}^2 g_i(x) & \sum_i \lambda_i \nabla_{vv}^2 g_i(x) & 0 & 0 \\ 0 & 0 & \nabla_{P^g P^g}^2 F & 0 \\ 0 & 0 & 0 & \nabla_{Q^g Q^g}^2 F \end{bmatrix}$$

Each of the following equations may be performed in parallel (reference 550 of FIG. 6):

$$\sum_i \lambda_i \nabla_{\delta\delta}^2 g_i(x)$$

$$\sum_i \lambda_i \nabla_{v\delta}^2 g_i(x) = \left(\sum_i \lambda_i \nabla_{\delta v}^2 g_i(x)\right)^T$$

$$\sum_i \lambda_i \nabla_{vv}^2 g_i(x).$$

In the above equations, $\lambda$ is a dual variable from the interior point method, and the $g_i(x)$ correspond to a combination of P, Q, and S. Note also that the Hessian would also be performed for the indexes i and ij. Using the multi-threading operations 550 illustrated by equations below, there is a four times speed improvement in Hessian forming, (also called "stamping") relative to a serial technique that does not use multi-threading. Furthermore, the Hessian can be computed from the Jacobian and the multi-threading operations 550 can take advantage of Hessian symmetry. For instance, $$\sum_i v_i \nabla_{v\delta}^2 g_i(x) = \left(\sum_i \lambda_i \nabla_{\delta v}^2 g_i(x)\right)^T$$

(where T means transpose), which means that only one of these needs to be determined.

The following are the Hessian matrices that are required for the index i in order to solve the above equations, each of which is a 2×2 matrix of second-order partial derivatives, each of which may be computed in parallel as part of multi-threaded operations 550 (although it should be noted that for each row, only three of these need to be computed):

$$\nabla_{\delta\delta}^2 P_i, \nabla_{\delta v}^2 P_i, \nabla_{v\delta}^2 P_i, \nabla_{vv}^2 P_i$$

$$\nabla_{\delta\delta}^2 Q_i, \nabla_{\delta v}^2 Q_i, \nabla_{v\delta}^2 Q_i, \nabla_{vv}^2 Q_i,$$

The same would also be performed for the indexes ij. That is (although it should be noted that for each row, only three of these need to be computed):

$$\nabla_{\delta\delta}^2 P_{ij}, \nabla_{\delta v}^2 P_{ij}, \nabla_{v\delta}^2 P_{ij}, \nabla_{vv}^2 P_{ij},$$

$$\nabla_{\delta\delta}^2 Q_{ij}, \nabla_{\delta v}^2 Q_{ij}, \nabla_{v\delta}^2 Q_{ij}, \nabla_{vv}^2 Q_{ij}$$

For $\nabla^2 P_i$, four Hessian matrices corresponding to $P_i$ are as follows for each node i:

$$\nabla_{vv}^2 P_i = \begin{bmatrix} \frac{\partial^2 P_i}{\partial |v_i|^2} & \frac{\partial^2 P_i}{\partial |v_i|\partial |v_j|} \\ \frac{\partial^2 P_i}{\partial |v_j|\partial |v_i|} & \frac{\partial^2 P_i}{\partial |v_j|^2} \end{bmatrix}, \nabla_{\delta\delta}^2 P_i = \begin{bmatrix} \frac{\partial^2 P_i}{\partial \delta_i^2} & \frac{\partial^2 P_i}{\partial \delta_i \partial \delta_j} \\ \frac{\partial^2 P_i}{\partial \delta_j \partial \delta_i} & \frac{\partial^2 P_i}{\partial \delta_j^2} \end{bmatrix},$$

$$\text{and } \nabla_{v\delta}^2 P_i = \nabla_{\delta v}^2 P_i = \begin{bmatrix} \frac{\partial^2 P_i}{\partial |v_i|\partial \delta_i} & \frac{\partial^2 p_i}{\partial |v_i|\partial \delta_j} \\ \frac{\partial^2 P_i}{\partial \delta_j \partial |v_i|} & \frac{\partial^2 P_i}{\partial |v_j|\partial \delta_j} \end{bmatrix}.$$

From (5), we have that $$\frac{\partial P_i}{\partial |v_i|} = \text{Re}\left(\frac{|v_i|^2 y_{ii}^*}{|v_i|} + \bar{t}_i^* \frac{v_i}{|v_i|}\right)$$

-continued $$= \text{Re}\left(\frac{|v_i|^2 y_{ii}^*}{|v_i|} + \sum_{k=1}^{n} y_{ik}^* v_k^* \frac{v_i}{|v_i|}\right)$$

Thus, we yield $$\frac{\partial^2 P_i}{\partial |v_i|^2} = \text{Re}(2y_{ii}^*) = 2G_{ii}$$

$$\frac{\partial^2 P_i}{\partial |v_i|\partial |v_j|} = \partial \text{Re}\left(i_i^* \frac{v_i}{|v_i|}\right) / \partial |v_j| = \partial \text{Re}\left(\frac{U_i}{|v_i|}\right) / \partial |v_j| = \frac{1}{|v_i|} \frac{\partial P_i}{\partial |v_j|}$$

$$\frac{\partial^2 P_i}{\partial |v_j|\partial |v_i|} = \frac{\partial^2 P_i}{\partial |v_i|\partial |v_j|}$$

$$\frac{\partial^2 P_i}{\partial |v_j|^2} = 0$$

G and B are components of the admittance matrix Y, Y=G+jB,

From (6), we have that $$\frac{\partial P_i}{\partial \delta_i} = \text{Re}(-j|v_i|^2 y_{ii}^* + ji_i^* v_i)$$

Thus, we obtain $$\frac{\partial^2 P_i}{\partial \delta_i^2} = \frac{\partial \text{Re}(ji_i^* v_i)}{\partial \delta} = -\frac{\partial Q_i}{\partial \delta_i}$$

$$\frac{\partial^2 P_i}{\partial \delta_i \partial \delta_j} = \frac{\partial^2 P_i}{\partial \delta_j \partial \delta_i} = -\frac{\partial Q_i}{\partial \delta_j}$$

$$\frac{\partial^2 P_i}{\partial \delta_j^2} = \frac{\partial Q_i}{\partial \delta_j},$$

$$\frac{\partial^2 P_i}{\partial |v_i|\partial \delta_i} = \partial \text{Re}\left(i_i^* \frac{v_i}{|v_i|}\right) / \partial \delta_i = \partial \text{Re}\left(\frac{U_i}{|v_i|}\right) / \partial \delta_i = \frac{1}{|v_i|} \frac{\partial P_i}{\partial \delta_i}$$

$$\frac{\partial^2 P_i}{\partial |v_i|\partial \delta_j} = \frac{\partial^2 P_i}{\partial \delta_j \partial |v_i|} = \frac{1}{|v_i|} \frac{\partial P_i}{\partial \delta_j}$$

$$\frac{\partial^2 P_i}{\partial |v_j|\partial \delta_j} = \frac{1}{|v_j|} \frac{\partial P_i}{\partial \delta_j}.$$

Thus, the second-order partial derivatives (as part of the Hessian function)

$$\left(\frac{\partial^2 P_i}{\partial \delta_j^2}, \frac{\partial^2 P_i}{\partial |v_j|\partial \delta_j}\right)$$

are computed using the Jacobian functions $$\left(\frac{\partial Q_i}{\partial \delta_j}, \frac{\partial P_i}{\partial \delta_j} \text{ respectively}\right)$$

respectively) (or results thereof), as indicated by reference 540 in FIG. 5.

For $\nabla^2 Q_i$, four Hessian matrices corresponding to $Q_i$ as follows for each node i:

$$\nabla^2_{vv} Q_i = \begin{bmatrix} \frac{\partial^2 Q_i}{\partial |v_i|^2} & \frac{\partial^2 Q_i}{\partial |v_i|\partial |v_j|} \\ \frac{\partial^2 Q_i}{\partial |v_j|\partial |v_i|} & \frac{\partial^2 Q_i}{\partial |v_j|^2} \end{bmatrix}, \nabla^2_{\delta\delta} Q_i = \begin{bmatrix} \frac{\partial^2 Q_i}{\partial \delta_i^2} & \frac{\partial^2 Q_i}{\partial \delta_i\partial \delta_j} \\ \frac{\partial^2 Q_i}{\partial \delta_j\partial \delta_i} & \frac{\partial^2 Q_i}{\partial \delta_j^2} \end{bmatrix},$$

and $\nabla^2_{v\delta} Q_i = \nabla^2_{\delta v} Q_i = \begin{bmatrix} \frac{\partial^2 Q_i}{\partial |v_i|\partial \delta_i} & \frac{\partial^2 Q_i}{\partial |v_i|\partial \delta_j} \\ \frac{\partial^2 Q_i}{\partial \delta_i\partial |v_i|} & \frac{\partial^2 Q_i}{\partial |v_j|\partial \delta_j} \end{bmatrix}.$ From (5), we have that $$\frac{\partial Q_i}{\partial |v_i|} = \text{Im}\left(\frac{|v_i|^2 y_{ii}^*}{|v_i|} + i_i^* \frac{v_i}{|v_i|}\right)$$

$$= \text{Im}\left(\frac{|v_i|^2 y_{ii}^*}{|v_i|} + \sum_{k=1}^{n} y_{ik}^* v_k^* \frac{v_i}{|v_i|}\right)$$

Then, we have $$\frac{\partial^2 Q_i}{\partial |v_i|^2} = -2B_{ii}$$

$$\frac{\partial^2 Q_i}{\partial |v_i|\partial |v_j|} = \frac{1}{|v_i|} \frac{\partial Q_i}{\partial |v_j|}$$

$$\frac{\partial^2 Q_i}{\partial |v_j|\partial |v_i|} = \frac{\partial^2 Q_i}{\partial |v_i|\partial |v_j|}$$

$$\frac{\partial^2 Q_i}{\partial |v_j|^2} = 0$$

From (6), we have that $$\frac{\partial Q_i}{\partial \delta_i} = \text{Im}(-j|v_i|^2 y_{ii}^* + ji_i^* v_i)$$

Thus, we obtain $$\frac{\partial^2 Q_i}{\partial \delta_i^2} = \frac{\partial P_i}{\partial \delta_i}$$

$$\frac{\partial^2 Q_i}{\partial \delta_i\partial \delta_j} = \frac{\partial^2 Q_i}{\partial \delta_j\partial \delta_i} = \frac{\partial P_i}{\partial \delta_i}$$

$$\frac{\partial^2 Q_i}{\partial \delta_j^2} = -\frac{\partial P_i}{\partial \delta_j}$$

$$\frac{\partial^2 Q_i}{\partial |v_i|\partial \delta_i} = \frac{1}{|v_i|} \frac{\partial Q_i}{\partial \delta_i}$$

$$\frac{\partial^2 Q_i}{\partial |v_i|\partial \delta_j} = \frac{\partial^2 Q_i}{\partial \delta_j\partial |v_i|} = \frac{1}{|v_i|} \frac{\partial Q_i}{\partial \delta_j}$$

$$\frac{\partial^2 Q_i}{\partial |v_j|\partial \delta_j} = \frac{1}{|v_j|} \frac{\partial Q_i}{\partial \delta_i}$$

Thus, the second-order partial derivatives (as part of the Hessian function)

$$\left(\frac{\partial^2 Q_i}{\partial \delta_j^2}, \frac{\partial^2 Q_i}{\partial |v_i| \partial \delta_j}\right)$$

are computed using the Jacobian functions $$\left(\frac{\partial P_i}{\partial \delta_j}, \frac{1}{|v_j|}\frac{\partial Q_i}{\partial \delta_j}, \text{respectively}\right)$$

respectively) (or results thereof), as indicated by reference 540 in FIG. 5.

For $\nabla^2 P_{ij}$, four Hessian matrices corresponding to $P_i$ are as follows for each node i:

$$\nabla_{vv}^2 P_{ij} = \begin{bmatrix} \frac{\partial^2 P_{ij}}{\partial |v_i|^2} & \frac{\partial^2 P_{ij}}{\partial |v_i| \partial |v_j|} \\ \frac{\partial^2 P_{ij}}{\partial |v_j| \partial |v_i|} & \frac{\partial^2 P_{ij}}{\partial |v_j|^2} \end{bmatrix},$$

$$\nabla_{\delta\delta}^2 P_{ij} = \begin{bmatrix} \frac{\partial^2 P_{ij}}{\partial \delta_i^2} & \frac{\partial^2 P_{ij}}{\partial \delta_i \partial \delta_j} \\ \frac{\partial^2 P_{ij}}{\partial \delta_j \partial \delta_i} & \frac{\partial^2 P_{ij}}{\partial \delta_j^2} \end{bmatrix},$$

$$\text{and } \nabla_{v\delta}^2 P_{ij} = \nabla_{\delta v}^2 P_{ij} = \begin{bmatrix} \frac{\partial^{2} P_{ij}}{\partial |v_i| \partial \delta_i} & \frac{\partial^2 P_{ij}}{\partial |v_i| \partial \delta_j} \\ \frac{\partial^2 P_{ij}}{\partial \delta_j \partial |v_i|} & \frac{\partial^2 P_{ij}}{\partial |v_j| \partial \delta_j} \end{bmatrix}$$

From (7) and (9), we have $$\frac{\partial P_{ij}}{\partial |v_i|} = \text{Re}\left(\frac{S_{ij}}{|v_i|} + |v_i| y_{ij}^*\right) = \frac{P_{ij}}{|v_i|} + |v_i| G_{ij}$$

$$\frac{\partial P_{ij}}{\partial |v_j|} = \frac{P_{ij}}{|v_i|} - |v_i| G_{ij}$$

Thus, we yield $$\frac{\partial^2 P_{ij}}{\partial |v_i|^2} = 2G_{ij}$$

$$\frac{\partial^2 P_{ij}}{\partial |v_j| \partial |v_i|} = \frac{\partial^2 P_{ij}}{\partial |v_i| \partial |v_j|} = -\frac{1}{|v_i|}\frac{\partial P_{ij}}{\partial |v_j|}$$

$$\frac{\partial^2 P_{ij}}{\partial |v_j|^2} = 0$$

From (8) and (10), we have $$\frac{\partial P_{ij}}{\partial \delta_i} = -Q_{ij} - |v_i|^2 B_{ij}$$

$$\frac{\partial P_{ij}}{\partial \delta_j} = Q_{ij} + |v_i|^2 B_{ij}$$

Thus, we obtain $$\frac{\partial^2 P_i}{\partial \delta_i^2} = -\frac{\partial Q_{ij}}{\partial \delta_i}$$

$$\frac{\partial^2 P_{ij}}{\partial \delta_i \partial \delta_j} = \frac{\partial^2 P_{ij}}{\partial \delta_j \partial \delta_i} = -\frac{\partial Q_{ij}}{\partial \delta_j}$$

$$\frac{\partial^2 P_{ij}}{\partial \delta_j^2} = \frac{\partial Q_{ij}}{\partial \delta_j}$$

$$\frac{\partial^2 P_{ij}}{\partial |v_i| \partial \delta_i} = \frac{1}{|v_i|}\frac{\partial P_{ij}}{\partial \delta_i}$$

$$\frac{\partial^2 P_{ij}}{\partial |v_i| \partial \delta_j} = \frac{\partial^2 P_{ij}}{\partial \delta_j \partial |v_i|} = \frac{1}{|v_i|}\frac{\partial P_{ij}}{\partial \delta_j}$$

$$\frac{\partial^2 P_{ij}}{\partial |v_j| \partial \delta_j} = \frac{1}{|v_j|}\frac{\partial P_{ij}}{\partial \delta_j}$$

Thus, the second-order partial derivatives as part of the Hessian function)

$$\left(\frac{\partial^2 P_{ij}}{\partial \delta_j^2}, \frac{\partial^2 P_{ij}}{\partial |v_j| \partial \delta_j}\right)$$

are computed using the Jacobian functions $$\left(\frac{\partial Q_{ij}}{\partial \delta_j}, \frac{\partial P_{ij}}{\partial \delta_j}, \text{respectively}\right)$$

respectively) (or results thereof), as indicated by reference 540 in FIG. 5.

For $\nabla^2 Q_{ij}$, from (7) and (9), we have $$\frac{\partial Q_{ij}}{\partial |v_i|} = \frac{Q_{ij}}{|v_{ij}|} - |v_{ij}| B_{ij}$$

$$\frac{\partial Q_{ij}}{\partial |v_j|} = \frac{Q_{ij}}{|v_i|} + |v_i| B_{ij}$$

Then, we have $$\frac{\partial^2 Q_{ij}}{\partial |v_i|^2} = -2B_{ij}$$

$$\frac{\partial^2 Q_{ij}}{\partial |v_j| \partial |v_i|} = \frac{\partial^2 Q_{ij}}{\partial |v_i| \partial |v_j|} = \frac{1}{|v_i|}\frac{\partial Q_{ij}}{\partial |v_j|}$$

$$\frac{\partial^2 Q_{ij}}{\partial |v_j|^2} = 0$$

From (8) and (10), we have $$\frac{\partial Q_{ii}}{\partial \delta_i} = P_{ij} - |v_i|^2 G_{ij}, \text{ and } \frac{\partial Q_{ij}}{\partial \delta_j} = -P_{ij} + |v_i|^2 G_{ij}$$

Thus, we obtain $$\frac{\partial^2 Q_{ij}}{\partial \delta_i^2} = \frac{\partial P_{ij}}{\partial \delta_i}$$

$$\frac{\partial^2 Q_{ij}}{\partial \delta_i \partial \delta_j} = \frac{\partial^2 Q_{ij}}{\partial \delta_j \partial \delta_i} = \frac{\partial P_{ij}}{\partial \delta_i}$$

$$\frac{\partial^2 Q_{ij}}{\partial \delta_j^2} = -\frac{\partial P_{ij}}{\partial \delta_j}$$

$$\frac{\partial^2 Q_{ij}}{\partial |v_i| \partial \delta_i} = \frac{1}{|v_i|} \frac{\partial Q_{ij}}{\partial \delta_i}$$

$$\frac{\partial^2 Q_{ij}}{\partial |v_i| \partial \delta_j} = \frac{\partial^2 Q_{ij}}{\partial \delta_j \partial |v_i|} = \frac{1}{|v_i|} \frac{\partial Q_{ij}}{\partial \delta_j}$$

$$\frac{\partial^2 Q_{ij}}{\partial |v_j| \partial \delta_j} = \frac{1}{|v_j|} \frac{\partial Q_{ij}}{\partial \delta_j}$$

Thus, the second-order partial derivatives as part of the Hessian function)

$$\left( \frac{\partial^2 Q_{ij}}{\partial \delta_j^2}, \frac{\partial^2 Q_{ij}}{\partial |v_j| \partial \delta_j} \right)$$

are computed using the Jacobian functions $$\left( \frac{\partial P_{ij}}{\partial \delta_j}, \frac{\partial Q_{ij}}{\partial \delta_j}, \text{respectively} \right)$$

respectively) or results thereof), as indicated by reference 540 in FIG. 5.

It should be noted that the above representations are merely exemplary. Although references 510, 530, and 550 indicate that multi-threading operations are performed at corresponding blocks 410/415, 420, and 425, it is not necessary to perform every one of these multi-threaded operations. For instance, the multi-threaded operations indicated by references 530 and 550 could be performed but the multi-threaded operations indicted by reference 510 might not be. As an example, only one of the multi-threaded operations indicated by references 510, 530, and 550 may be performed and the other two would not be performed (via multi-threading).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium does not include propagating signals and may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport it program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   solving on a computing system an optimal power flow formulation for a plurality of generators in a power system, wherein the solving comprises:
   computing using multi-threaded parallelism a plurality of constraints for the formulation;
   computing using multi-threaded parallelism a plurality of Jacobian functions of the constraints, the computing using multi-threaded parallelism the plurality of Jacobian functions of the constraints further comprising storing certain values computed when computing the plurality of constraints for the formulation and comprising using the certain values of when computing the plurality of Jacobian functions, wherein the certain values comprise values for a conjugate current vector $i^*$, $S_{ij}$, which is power on a transmission line from a node i to a node j, and $v_i v_j^* y_{ij}^*$, where $v_i$ is a voltage at node i, $v_j^*$ is a conjugate of a voltage at node j, and $y_{ij}^*$ is a conjugate of an admittance from node i to a node j; and
   computing using multi-threaded parallelism a Hessian of Lagrangian functions; and
   outputting results of the solving, wherein the results comprise values of generation levels for the plurality of generators.

2. The method of claim 1, wherein the outputting further comprises outputting a portion or all of the results to one or more operators able to modify output of at least one of the plurality of generators to corresponding one or more values in the results.

3. The method of claim 1, wherein computing using multi-threaded parallelism the plurality of Jacobian functions of the constraints further comprises computing each of the Jacobian functions $$\frac{\partial S_{ij}}{\partial |v_i|}, \frac{\partial S_{ij}}{\partial \delta_i}, \frac{\partial S_{ij}}{\partial |v_j|} \text{ and } \frac{\partial S_{ii}}{\partial \delta_j}$$

in parallel, where $S_{ij}$ is power on a transmission line from a node i to a node j, $v_i$ is a voltage at node i, $v_j$ is a voltage at node j, $\delta_i$ is an instantaneous phase at node i, and $\delta_j$ is an instantaneous phase at node j.

4. The method of claim 3, wherein computing using multi-threaded parallelism the plurality of Jacobian functions further comprises, for each one of the Jacobian functions, grouping columns in a matrix calculation used to determine results for the one Jacobian function, and computing each of the grouped columns in parallel.

5. The method of claim 3, wherein computing using multi-threaded parallelism a Hessian of Lagrangian functions further comprises computing each of the following second-order partial derivatives in parallel:

$\nabla_{\delta\delta}^2 P_i, \nabla_{\delta v}^2 P_i, \nabla_{v\delta}^2 P_i, \nabla_{vv}^2 P_i$ $\nabla_{\delta\delta}^2 Q_i, \nabla_{\delta v}^2 Q_i, \nabla_{v\delta}^2 Q_i, \nabla_{vv}^2 Q_i$, and $\nabla_{\delta\delta}^2 P_{ij}, \nabla_{\delta v}^2 P_{ij}, \nabla_{v\delta}^2 P_{ij}, \nabla_{vv}^2 P_{ij}$ $\nabla_{\delta\delta}^2 Q_{ij}, \nabla_{\delta v}^2 Q_{ij}, \nabla_{v\delta}^2 Q_{ij}, \nabla_{vv}^2 Q_{ij}$ each of which is a 2×2 matrix of second-order partial derivatives, and wherein $\delta$ is an instantaneous phase, v is a voltage, P is a power of a generator, and Q is a reactive power of the generator.

6. The method of claim 5, wherein computing using multi-threaded parallelism a Hessian of Lagrangian functions further comprises calculating each of the following equations in parallel using at least the second-order partial derivatives:

$$\sum_i \lambda_i \nabla_{\delta\delta}^2 g_i(x)$$

$$\sum_i \lambda_i \nabla_{v\delta}^2 g_i(x) = \left(\sum_i \lambda_i \nabla_{\delta v}^2 g_i(x)\right)^T,$$

$$\sum_i \lambda_i \nabla_{vv}^2 g_i(x),$$

where $\lambda$ is a dual variable from an interior point method, and the $g_i(x)$ correspond to a combination of P and Q.

7. The method of claim 5, wherein:
computing using multi-threaded parallelism the plurality of Jacobian functions of the constraints further comprises storing certain results of the Jacobian functions when computing the plurality of Jacobian functions of the constraints; and computing using multi-threaded parallelism a Hessian of Lagrangian functions further comprises using the certain results of the Jacobian functions when computing the plurality of Hessians of Lagrangian functions.

8. The method of claim 7, wherein using the certain results of the Jacobian functions when computing the Hessian of Lagrangian functions further comprises:

computing the second-order partial derivatives, as part of a Hessian function, $$\frac{\partial^2 P_i}{\partial \delta_j^2}, \frac{\partial^2 P_i}{\partial |v_j| \partial \delta_j}$$

using stored results of Jacobian functions $$\frac{\partial Q_i}{\partial \delta_j}, \frac{\partial P_i}{\partial \delta_j}$$

respectively;

computing the second-order partial derivatives, as part of the Hessian function, $$\frac{\partial^2 Q_i}{\partial \delta_j^2}, \frac{\partial^2 Q_i}{\partial |v_j| \partial \delta_j}$$

using stored results of the Jacobian functions $$\frac{\partial P_i}{\partial \delta_j}, \frac{1}{|v_j|}\frac{\partial Q_i}{\partial \delta_j},$$

respectively;

computing the second-order partial derivatives, as part of the Hessian function, $$\frac{\partial^2 P_i}{\partial \delta_j^2}, \frac{\partial^2 P_i}{\partial |v_j| \partial \delta_j}$$

using stored results of the Jacobian functions $$(\frac{\partial Q_{ij}}{\partial \delta_j}, \frac{\partial P_{ij}}{\partial \delta_j},$$

respectively; and computing the second-order partial derivatives, as part of the Hessian function, $$\frac{\partial^2 Q_{ij}}{\partial \delta_j^2}, \frac{\partial^2 Q_{ij}}{\partial |v_j| \partial \delta_i}$$

using stored results of the Jacobian functions $$\frac{\partial P_{ij}}{\partial \delta_j}, \frac{\partial Q_{ij}}{\partial \delta_j},$$

respectively.

9. The method of claim 1, wherein solving the optimal power flow formulation uses complex numbers instead of trigonometric functions.

10. A computing system, comprising:

one or more memories comprising computer-readable code;

one or more processors, wherein the one or more processors are configured, in response to execution of the computer-readable code, to cause the apparatus to perform the following:

solving on a computing system an optimal power flow formulation for a plurality of generators in a power system, wherein the solving comprises:

computing using multi-threaded parallelism a plurality of constraints for the formulation;

computing using multi-threaded parallelism a plurality of Jacobian functions of the constraints, the computing using multi-threaded parallelism the plurality of Jacobian functions of the constraints further comprising storing certain values computed when computing the plurality of constraints for the formulation and comprising using the certain values of when computing the plurality of Jacobian functions, wherein the certain values comprise values for a conjugate current vector i*, $S_{ij}$, which is power on a transmission line from a node i to a node j, and $v_i v_j^* y_{ij}^*$, where $v_i$ is a voltage at node i, $v_j^*$ is a conjugate of a voltage at node j, and $y_{ij}^*$ is a conjugate of an admittance from node i to a node j; and computing using multi-threaded parallelism a Hessian of Lagrangian functions; and outputting results of the solving, wherein the results comprise values of generation levels for the plurality of generators.

11. The computing system of claim 10, wherein the outputting further comprises outputting a portion or all of the results to one or more operators able to modify output of at least one of the plurality of generators to corresponding one or more values in the results.

12. The computing system of claim 10, wherein computing using multi-threaded parallelism the plurality of Jacobian functions of the constraints further comprises computing each of the Jacobian functions $$\frac{\partial S_{ij}}{\partial |v_i|}, \frac{\partial S_{ij}}{\partial \delta_i}, \frac{\partial S_{ij}}{\partial |v_j|} \text{ and } \frac{\partial S_{ij}}{\partial \delta_j}$$

in parallel, where $S_{ij}$ is power on a transmission line from a node i to a node j, $v_i$ is a voltage at node i, $v_j$ is a voltage at node j, $\delta_i$ is an instantaneous phase at node i, and $\delta_j$ is an instantaneous phase at node j.

13. The computing system of claim 12, wherein computing using multi-threaded parallelism the plurality of Jacobian functions further comprises, for each one of the Jacobian functions, grouping columns in a matrix calculation used to determine results for the one Jacobian function, and computing each of the grouped columns in parallel.

14. The computing system of claim 12, wherein computing using multi-threaded parallelism a Hessian of Lagrangian functions further comprises computing each of the following second-order partial derivatives in parallel:

$$\nabla_{\delta\delta}^2 P_i, \nabla_{\delta v}^2 P_i, \nabla_{v\delta}^2 P_i, \nabla_{vv}^2 P_i$$

$$\nabla_{\delta\delta}^2 Q_i, \nabla_{\delta v}^2 Q_i, \nabla_{v\delta}^2 Q_i, \nabla_{vv}^2 Q_i, \text{ and}$$

$$\nabla_{\delta\delta}^2 P_{ij}, \nabla_{\delta v}^2 P_{ij}, \nabla_{v\delta}^2 P_{ij}, \nabla_{vv}^2 P_{ij}$$

$$\nabla_{\delta\delta}^2 Q_{ij}, \nabla_{\delta v}^2 Q_{ij}, \nabla_{v\delta}^2 Q_{ij}, \nabla_{vv}^2 Q_{ij}$$

each of which is a 2×2 matrix of second-order partial derivatives, and wherein δ is an instantaneous phase, v is a voltage, P is a power of a generator, and Q is a reactive power of the generator.

15. The computing system of claim 12, wherein computing using multi-threaded parallelism a Hessian of Lagrangian functions further comprises calculating each of the following equations in parallel using at least the second-order partial derivatives:

$$\sum_i \lambda_i \nabla_{\delta\delta}^2 g_i(x)$$

$$\sum_i \lambda_i \nabla_{v\delta}^2 g_i(x) = \left( \sum_i \lambda_i \nabla_{\delta v}^2 g_i(x) \right)^T,$$

$$\sum_i \lambda_i \nabla_{vv}^2 g_i(x)$$

where λ is a dual variable from an interior point method, and the $g_i(x)$ correspond to a combination of P and Q.

16. The computing system of claim 15, wherein:
computing using multi-threaded parallelism the plurality of Jacobian functions of the constraints further comprises storing certain results of the Jacobian functions when computing the plurality of Jacobian functions of the constraints; and
computing using multi-threaded parallelism a Hessian of Lagrangian functions further comprises using the certain results of the Jacobian functions when computing the Hessian of Lagrangian functions.

17. The computing system of claim 16, wherein using the certain results of the Jacobian functions when computing the Hessian of Lagrangian functions further comprises:
computing the second-order partial derivatives, as part of a Hessian function, $$\frac{\partial^2 P_{ij}}{\partial \delta_j^2}, \frac{\partial^2 P_{ij}}{\partial |v_j| \partial \delta_j}$$

using stored results of Jacobian functions $$\frac{\partial Q_i}{\partial \delta_j}, \frac{\partial P_i}{\partial \delta_j}$$

respectively;
computing the second-order partial derivatives, as part of the Hessian function, $$\frac{\partial^2 Q_i}{\partial \delta_j^2}, \frac{\partial^2 Q_i}{\partial |v_j| \delta_j}$$

using stored results of the Jacobian functions $$\frac{\partial P_i}{\partial \delta_j}, \frac{1}{|v_j|} \frac{\partial Q_i}{\partial \delta_j},$$

respectively;
computing the second-order partial derivatives, as part of the Hessian function, $$\frac{\partial^2 P_{ij}}{\partial \delta_j^2}, \frac{\partial^2 Q_{ij}}{\partial |v_j| \partial \delta_j}$$

using stored results of the Jacobian functions $$\left( \frac{\partial Q_{ij}}{\partial \delta_j}, \frac{\partial P_{ij}}{\partial \delta_j}, \right.$$

respectively; and
computing the second-order partial derivatives, as part of the Hessian function, $$\frac{\partial^2 Q_{ij}}{\partial \delta_j^2}, \frac{\partial^2 Q_{ij}}{\partial |v_j| \partial \delta_j}$$

using stored results of the Jacobian functions $$\frac{\partial P_{ij}}{\partial \delta_j}, \frac{\partial Q_{ij}}{\partial \delta_j},$$

respectively.

18. The computing system of claim 10, wherein solving the optimal power flow formulation uses complex numbers instead of trigonometric functions.

19. A computer program product comprising a computer readable storage medium having program code embodied therewith, the program code executable by a computing system to cause the computing system to perform:
solving on a computing system an optimal power flow formulation for a plurality of generators in a power system, wherein the solving comprises:
computing using multi-threaded parallelism a plurality of constraints for the formulation;
computing using multi-threaded parallelism a plurality of Jacobian functions of the constraints, the computing using multi-threaded parallelism the plurality of Jacobian functions of the constraints further comprising storing certain values computed when computing the plurality of constraints for the formulation and comprising using the certain values of when computing the plurality of Jacobian functions, wherein the certain values comprise values for a conjugate current vector i*, $S_{ij}$, which is power on a transmission line from a node i to a node j, and $v_i v_j^* y_{ij}^*$, where $v_i$ is a voltage at node i, $v_j$ is a conjugate of a voltage at node j, and $y_{ij}^*$ is a conjugate of an admittance from node i to a node j; and computing using multi-threaded parallelism a Hessian of Lagrangian functions; and outputting results of the solving, wherein the results comprise values of generation levels for the plurality of generators.

* * * * *